(12) United States Patent
Ghoddoosian et al.

(10) Patent No.: US 12,169,964 B2
(45) Date of Patent: Dec. 17, 2024

(54) SYSTEM AND METHOD FOR PROVIDING WEAKLY-SUPERVISED ONLINE ACTION SEGMENTATION

(71) Applicant: Honda Motor Co., Ltd., Tokyo (JP)

(72) Inventors: Reza Ghoddoosian, Milpitas, CA (US); Isht Dwivedi, Mountain View, CA (US); Nakul Agarwal, San Jose, CA (US); Chiho Choi, San Jose, CA (US); Behzad Dariush, San Ramon, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 494 days.

(21) Appl. No.: 17/590,379

(22) Filed: Feb. 1, 2022

(65) Prior Publication Data

US 2023/0141037 A1 May 11, 2023

Related U.S. Application Data

(60) Provisional application No. 63/278,001, filed on Nov. 10, 2021.

(51) Int. Cl.
*G06V 10/778* (2022.01)
*G06V 10/26* (2022.01)
(Continued)

(52) U.S. Cl.
CPC .......... *G06V 10/7792* (2022.01); *G06V 10/26* (2022.01); *G06V 10/82* (2022.01); *G06V 20/49* (2022.01); *G06V 40/20* (2022.01)

(58) Field of Classification Search
None
See application file for complete search history.

(56) References Cited

U.S. PATENT DOCUMENTS

| | | | |
|---|---|---|---|
| 11,538,564 B2 * | 12/2022 | Yao | G06V 40/171 |
| 11,626,195 B2 * | 4/2023 | Lyman | G06Q 20/14 |
| | | | 705/2 |

(Continued)

OTHER PUBLICATIONS

Yazan Abu Farha and Juergen Gall. Uncertainty-aware anticipation of activities. In Proceedings of the IEEE/CVF International Conference on Computer Vision Workshops, pp. 0-0, 2019.

(Continued)

*Primary Examiner* — Anand P Bhatnagar
(74) *Attorney, Agent, or Firm* — RANKIN, HILL & CLARK LLP

(57) ABSTRACT

A system and method for providing weakly-supervised online action segmentation that include receiving image data associated with multi-view videos of a procedure, wherein the procedure involves a plurality of atomic actions. The system and method also include analyzing the image data using weakly-supervised action segmentation to identify each of the plurality of atomic actions by using an ordered sequence of action labels. The system and method additionally include training a neural network with data pertaining to the plurality of atomic actions based on the weakly-supervised action segmentation. The system and method further include executing online action segmentation to label atomic actions that are occurring in real-time based on the plurality of atomic actions trained to the neural network.

20 Claims, 4 Drawing Sheets

(51) Int. Cl.
  *G06V 10/82* (2022.01)
  *G06V 20/40* (2022.01)
  *G06V 40/20* (2022.01)

(56) References Cited

U.S. PATENT DOCUMENTS

| | | | | |
|---|---|---|---|---|
| 11,669,792 | B2* | 6/2023 | Lyman | G06Q 20/145 |
| | | | | 705/2 |
| 11,748,677 | B2* | 9/2023 | Prosky | G06V 10/225 |
| | | | | 382/132 |
| 11,790,297 | B2* | 10/2023 | Lyman | G16H 50/50 |
| | | | | 705/3 |
| 11,823,106 | B2* | 11/2023 | Lyman | G16H 30/40 |
| 11,887,354 | B2* | 1/2024 | Zhang | G06V 10/40 |
| 2006/0161814 | A1* | 7/2006 | Wocke | G06F 18/2137 |
| | | | | 714/26 |
| 2020/0160974 | A1* | 5/2020 | Yao | G06T 7/187 |
| 2022/0180622 | A1* | 6/2022 | Zhang | G06T 7/194 |
| 2022/0215915 | A1* | 7/2022 | Lyman | H04L 67/12 |

OTHER PUBLICATIONS

Yizhak Ben-Shabat, Xin Yu, Fatemeh Saleh, Dylan Campbell, Cristian Rodriguez-Opazo, Hongdong Li, and Stephen Gould. The ikea asm dataset: Understanding people assembling furniture through actions, objects and pose. In Proceedings of the IEEE/CVF Winter Conference on Applications of Computer Vision, pp. 847-859, 2021.

Joao Carreira and Andrew Zisserman. Quo vadis, action recognition? a new model and the kinetics dataset. In proceedings of the IEEE Conference on Computer Vision and Pattern Recognition, pp. 6299-6308, 2017.

Chien-Yi Chang, De-An Huang, Yanan Sui, Li Fei-Fei, and Juan Carlos Niebles. D3tw: Discriminative differentiable dynamic time warping for weakly supervised action alignment and segmentation. In Proceedings of the IEEE/CVF Conference on Computer Vision and Pattern Recognition, pp. 3546-3555, 2019.

Chien-Yi Chang, De-An Huang, Danfei Xu, Ehsan Adeli, Li Fei-Fei, and Juan Carlos Niebles. Procedure planning in Instructional videos. arXiv preprint arXiv: 1907.01172, 2019.

Xiaobin Chang, Frederick Tung, and Greg Mori. Learning discriminative prototypes with dynamic time warping. In Proceedings of the IEEE/CVF Conference on Computer Vision and Pattern Recognition, pp. 8395-8404, 2021.

Junyoung Chung, Caglar Gulcehre, KyungHyun Cho, and Yoshua Bengio. Empirical evaluation of gated recurrent neural networks on sequence modeling. arXiv preprint arXiv:1412.3555, 2014.

Li Ding and Chenliang Xu. Weakly-supervised action segmentation with iterative soft boundary assignment. In Proceedings of the IEEE Conference on Computer Vision and Pattern Recognition, pp. 6508-6516, 2018.

Hyunjun Eun, Jinyoung Moon, Jongyoul Park, Chanho Jung, and Changick Kim. Learning to discriminate information for online action detection. In Proceedings of the IEEE/CVF Conference on Computer Vision and Pattern Recognition, pp. 809-818, 2020.

Chenyou Fan, Jangwon Lee, Mingze Xu, Krishna Kumar Singh, Yong Jae Lee, David J Crandall, and Michael S Ryoo. Identifying first-person camera wearers in thirdperson videos. In Proceedings of the IEEE Conference on Computer Vision and Pattern Recognition, pp. 5125-5133, 2017.

Yazan Abu Farha and Jurgen Gall. Ms-tcn: Multi-stage temporal convolutional network for action segmentation. In Proceedings of the IEEE/CVF Conference on Computer Vision and Pattern Recognition, pp. 3575-3584, 2019.

Antonino Furnari and Giovanni Maria Farinella. What would you expect? anticipating egocentric actions with rollingunrolling lstms and modality attention. In Proceedings of the IEEE/CVF International Conference on Computer Vision, pp. 6252-6261, 2019.

Jiyang Gao, Zhenheng Yang, and Ram Nevatia. Red: Reinforced encoder-decoder networks for action anticipation. arXiv preprint arXiv:1707.04818, 2017.

Mingfei Gao, Mingze Xu, Larry S Davis, Richard Socher, and Caiming Xiong. Startnet: Online detection of action start In untrimmed videos. In Proceedings of the IEEE/CVF International Conference on Computer Vision, pp. 5542-5551, 2019.

Mingfei Gao, Yingbo Zhou, Ran Xu, Richard Socher, and Caiming Xiong. Woad: Weakly supervised online action detection in untrimmed videos. In Proceedings of the IEEE/CVF Conference on Computer Vision and Pattern Recognition, pp. 1915-1923, 2021.

Shang-Hua Gao, Qi Han, Zhong-Yu Li, Pai Peng, Liang Wang, and Ming-Ming Cheng. Global2local: Efficient structure search for video action segmentation. In Proceedings of the IEEE/CVF Conference on Computer Vision and Pattern Recognition, pp. 16805-16814, 2021.

Reza Ghoddoosian, Saif Sayed, and Vassilis Athitsos. Action duration prediction for segment-level alignment of weaklylabeled videos. In Proceedings of the IEEE/CVF Winter Conference on Applications of Computer Vision, pp. 2053-2062, 2021.

Reza Ghoddoosian, Saif Sayed, and Vassilis Athitsos. Hierarchical modeling and action segmentation in weakly-labeled instructional videos. arXiv preprint arXiv:2110.05697, 2021.

Sanjay Haresh, Sateesh Kumar, Huseyin Coskun, Shahram N Syed, Andrey Konin, Zeeshan Zia, and Quoc-Huy Tran. Learning by aligning videos in time. In Proceedings of the IEEE/CVF Conference on Computer Vision and Pattern Recognition, pp. 5548-5558, 2021.

Hsuan-I Ho, Wei-Chen Chiu, and Yu-Chiang Frank Wang. Summarizing first-person videos from third persons' points of view. In Proceedings of the European Conference on Computer Vision (ECCV), pp. 70-85, 2018.

Yuchi Ishikawa, Seito Kasai, Yoshimitsu Aoki, and Hirokatsu Kataoka. Alleviating over-segmentation errors by detecting action boundaries. In Proceedings of the IEEE/CVF Winter Conference on Applications of Computer Vision, pp. 2322-2331, 2021.

Qiuhong Ke, Mario Fritz, and Bernt Schiele. Timeconditioned action anticipation in one shot. In Proceedings of the IEEE/CVF Conference on Computer Vision and Pattern Recognition, pp. 9925-9934, 2019.

Hilde Kuehne, Ali Arslan, and Thomas Serre. The language of actions: Recovering the syntax and semantics of goaldirected human activities. In Proceedings of the IEEE conference on computer vision and pattern recognition, pp. 780-787, 2014.

Sateesh Kumar, Sanjay Haresh, Awais Ahmed, Andrey Konin, M Zeeshan Zia, and Quoc-Huy Tran. Unsupervised activity segmentation by joint representation learning and online clustering. 2021.

Yaman Kumar, Mayank Aggarwal, Pratham Nawal, Shin'ichi Satoh, Rajiv Ratn Shah, and Roger Zimmermann. Harnessing ai for speech reconstruction using multi-view silent video feed. In Proceedings of the 26th ACM International conference on Multimedia, pp. 1976-1983, 2018.

Jun Li, Peng Lei, and Sinisa Todorovic. Weakly supervised energy-based learning for action segmentation. In Proceedings of the IEEE/CVF International Conference on Computer Vision, pp. 6243-6251, 2019.

Zhe Li, Yazan Abu Farha, and Jurgen Gall. Temporal action segmentation from timestamp supervision. In Proceedings of the IEEE/CVF Conference on Computer Vision and Pattern Recognition, pp. 8365-8374, 2021.

Yunyu Liu, Lichen Wang, Yue Bai, Can Qin, Zhengming Ding, and Yun Fu. Generative view-correlation adaptation for semi-supervised multi-view learning. In European Conference on Computer Vision, pp. 318-334. Springer, 2020.

Tahmida Mahmud, Mahmudul Hasan, and Amit K Roy-Chowdhury. Joint prediction of activity labels and starting times in untrimmed videos. In Proceedings of the IEEE International conference on Computer Vision, pp. 5773-5782, 2017.

Jingjing Meng, Suchen Wang, Hongxing Wang, Junsong Yuan, and Yap-Peng Tan. Video summarization via Multiview representative selection. In Proceedings of the IEEE International Conference on Computer Vision Workshops, pp. 1189-1198, 2017.

(56) References Cited

OTHER PUBLICATIONS

Rameswar Panda and Amit K Roy-Chowdhury. Multi-view surveillance video summarization via joint embedding and sparse optimization. IEEE Transactions on Multimedia, 19(9):2010-2021, 2017.
Paritosh Parmar and Brendan Tran Morris. What and how well you performed? a multitask learning approach to action quality assessment. In Proceedings of the IEEE Conference on Computer Vision and Pattern Recognition, pp. 304-313, 2019.
Florent Perronnin and Christopher Dance. Fisher kernels on visual vocabularies for image categorization. In 2007 IEEE conference on computer vision and pattern recognition, pp. 1-8. IEEE, 2007.
AJ Piergiovanni and Michael S Ryoo. Recognizing actions in videos from unseen viewpoints. In Proceedings of the IEEE/CVF Conference on Computer Vision and Pattern Recognition, pp. 4124-4132, 2021.
Sanqing Qu, Guang Chen, Dan Xu, Jinhu Dong, Fan Lu, and Alois Knoll. Lap-net: Adaptive features sampling via earning action progression for online action detection. arXiv preprint arXiv:2011.07915, 2020.
Alexander Richard, Hilde Kuehne, and Juergen Gall. Weakly supervised action learning with mn based fine-to-coarse modeling. In Proceedings of the IEEE conference on Computer Vision and Pattern Recognition, pp. 754-763, 2017.
Alexander Richard, Hilde Kuehne, Ahsan Iqbal, and Juergen Gall. Neuralnetwork-viterbi: A framework for weakly supervised video learning. In Proceedings of the IEEE conference on Computer Vision and Pattern Recognition, pp. 7386-7395, 2018.
Charles Ringer and Mihalis A Nicolaou. Deep unsupervised multiview detection of video game stream highlights. In Proceedings of the 13th International Conference on the Foundations of Digital Games, pp. 1-6, 2018.
Marcus Rohrbach, Anna Rohrbach, Michaela Regneri, Sikandar Amin, Mykhaylo Andriluka, Manfred Pinkal, and Bernt Schiele. Recognizing fine-grained and composite activities using handcentric features and script data. International Journal of Computer Vision, 119(3):346-373, 2016.
Saquib Sarfraz, Naila Murray, Vivek Sharma, Ali Diba, Luc Van Gool, and Rainer Stiefelhagen. Temporally-weighted hierarchical clustering for unsupervised action segmentation. In Proceedings of the IEEE/CVF Conference on Computer Vision and Pattern Recognition, pp. 11225-11234, 2021.
Fadime Sener, Dipika Singhania, and Angela Yao. Temporal aggregate representations for long-range video understanding. In European Conference on Computer Vision, pp. 154-171. Springer, 2020.
Fadime Sener and Angela Yao. Unsupervised learning and segmentation of complex activities from video. In Proceedings of the IEEE Conference on Computer Vision and Pattern Recognition, pp. 8368-8376, 2018.
Pierre Sermanet, Corey Lynch, Yevgen Chebotar, Jasmine Hsu, Eric Jang, Stefan Schaal, Sergey Levine, and Google Brain. Timecontrastive networks: Self-supervised learning from video. In 2018 IEEE international conference on robotics and automation (ICRA), pp. 1134-1141. IEEE, 2018.
Zheng Shou, Junting Pan, Jonathan Chan, Kazuyuki Miyazawa, Hassan Mansour, Anthony Vetro, Xavier Giro-I Nieto, and Shih-Fu Chang. Online detection of action start in untrimmed, streaming videos. In Proceedings of the European Conference on Computer Vision (ECCV), pp. 534-551, 2018.
Gunnar A Sigurdsson, Abhinav Gupta, Cordelia Schmid, Ali Farhadi, and Karteek Alahari. Actor and observer: Joint modeling of first and third-person videos. In Proceedings of the IEEE Conference on Computer Vision and Pattern Recognition, pp. 7396-7404, 2018.
Yaser Souri, Yazan Abu Farha, Fabien Despinoy, Gianpiero Francesca, and Juergen Gall. Fifa: Fast inference approximation for action segmentation. arXiv preprint arXiv:2108.03894, 2021.
Yaser Souri, Mohsen Fayyaz, Luca Minciullo, Gianpiero Francesca, and Juergen Gall. Fast weakly supervised action segmentation using mutual consistency. IEEE Transactions on Pattern Analysis and Machine Intelligence, 2021.
Yansong Tang, Dajun Ding, Yongming Rao, Yu Zheng, Danyang Zhang, Lili Zhao, Jiwen Lu, and Jie Zhou. Coin: A large-scale dataset for comprehensive instructional video analysis. In Proceedings of the IEEE Conference on Computer Vision and Pattern Recognition, pp. 1207-1216, 2019.
Shruti Vyas, Yogesh S Rawat, and Mubarak Shah. Multiview action recognition using cross-view video prediction. In ECCV, pp. 427-444. Springer, 2020.
Dongang Wang, Wanli Ouyang, Wen Li, and Dong Xu. Dividing and aggregating network for multi-view action recognition. In ECCV, pp. 451-467, 2018.
Andra Acsintoae, Andrei Florescu, Mariana-Iuliana Georgescu, Tudor Mare, Paul Sumedrea, Radu Tudor Ionescu, Fahad Shahbaz Khan, and Mubarak Shah. Ubnormal: New benchmark for supervised open-set video anomaly detection. In Proceedings of the IEEE/CVF Conference on Computer Vision and Pattern Recognition, pp. 20143-20153, 2022.
Jean-Baptiste Alayrac, Piotr Bojanowski, Nishant Agrawal, Josef Sivic, Ivan Laptev, and Simon Lacoste-Julien. Unsupervised learning from narrated instruction videos. In Proceedings of the IEEE Conference on Computer Vision and Pattern Recognition, pp. 4575-4583, 2016.
Marcella Astrid, Muhammad Zaigham Zaheer, Jae-Yeong Lee, and Seung-Ik Lee. Learning not to reconstruct anomalies. arXiv preprint arXiv:2110.09742, 2021.
Nadine Behrmann, S Alireza Golestaneh, Zico Kolter, Jürgen Gall, and Mehdi Noroozi. Unified fully and timestamp supervised temporal action segmentation via sequence to sequence translation. In Computer Vision-ECCV 2022: 17th European Conference, Tel Aviv, Israel, Oct. 23-27, 2022, Proceedings, Part XXXV, pp. 52-68. Springer, 2022.
Dima Damen, Hazel Doughty, Giovanni Maria Farinella, Antonino Furnari, Evangelos Kazakos, Jian Ma, Davide Moltisanti, Jonathan Munro, Toby Perrett, Will Price, et al. Rescaling egocentric vision: Collection, pipeline and challenges for epic-kitchens-100. International Journal of Computer Vision, pp. 1-23, 2022.
Hanqiu Deng, Zhaoxiang Zhang, Shihao Zou, and Xingyu Li. Bi-directional frame interpolation for unsupervised video anomaly detection. In Proceedings of the IEEE/CVF Winter Conference on Applications of Computer Vision, pp. 2634-2643, 2023.
Ehsan Elhamifar and Zwe Naing. Unsupervised procedure learning via joint dynamic summarization. In Proceedings of the IEEE/CVF International Conference on Computer Vision, pp. 6341-6350, 2019.
Alireza Fathi, Xiaofeng Ren, and James M Rehg. Learning to recognize objects in egocentric activities. In CVPR 2011, pp. 3281-3288. IEEE, 2011.
Reza Ghoddoosian, Isht Dwivedi, Nakul Agarwal, Chiho Choi, and Behzad Dariush. Weakly-supervised online action segmentation in multi-view instructional videos. In Proceedings of the IEEE/CVF Conference on Computer Vision and Pattern Recognition, pp. 13780-13790, 2022.
Hilde Kuehne, Alexander Richard, and Juergen Gall. Weakly supervised learning of actions from transcripts. Computer Vision and Image Understanding, 163:78-89, 2017.
Anna Kukleva, Hilde Kuehne, Fadime Sener, and Jurgen Gall. Unsupervised learning of action classes with continuous temporal embedding. In Proceedings of the IEEE/CVF Conference on Computer Vision and Pattern Recognition, pp. 12066-12074, 2019.
Dongha Lee, Sehun Yu, Hyunjun Ju, and Hwanjo Yu. Weakly supervised temporal anomaly segmentation with dynamic time warping. In Proceedings of the IEEE/CVF International Conference on Computer Vision, pp. 7355-7364, 2021.
Sangmin Lee, Hak Gu Kim, and Yong Man Ro. Bman: Bidirectional multi-scale aggregation networks for abnormal event detection. IEEE Transactions on Image Processing, 29:2395-2408, 2019.
Yin Li, Miao Liu, and JamesMRehg. In the eye of beholder: Joint learning of gaze and actions in first person video. In Proceedings of the European conference on computer vision (ECCV), pp. 619-635, 2018.
Zijia Lu and Ehsan Elhamifar. Weakly-supervised action segmentation and alignment via transcript-aware union-ofsubspaces learning. In Proceedings of the IEEE/CVF International Conference on Computer Vision, pp. 8085-8095, 2021.

(56) References Cited

OTHER PUBLICATIONS

Didik Purwanto, Yie-Tarng Chen, and Wen-Hsien Fang. Dance with self-attention: A new look of conditional random fields on anomaly detection in videos. In Proceedings of the IEEE/CVF International Conference on Computer Vision, pp. 173-183, 2021.
Yicheng Qian, Weixin Luo, Dongze Lian, Xu Tang, Peilin Zhao, and Shenghua Gao. Svip: Sequence verification for procedures in videos. In Proceedings of the IEEE/CVF Conference on Computer Vision and Pattern Recognition, pp. 19890-19902, 2022.
Nicolae-Cătălin Ristea, Neelu Madan, Radu Tudor Ionescu, Kamal Nasrollahi, Fahad Shahbaz Khan, Thomas B Moeslund, and Mubarak Shah. Self-supervised predictive convolutional attentive block for anomaly detection. In Proceedings of the IEEE/CVF Conference on Computer Vision and Pattern Recognition, pp. 13576-13586, 2022.
Sebastian Stein and Stephen J McKenna. Combining embedded accelerometers with computer vision for recognizing food preparation activities. In Proceedings of the 2013 ACM international joint conference on Pervasive and ubiquitous computing, pp. 729-738, 2013.
Kamalakar Vijay Thakare, Yash Raghuwanshi, Debi Prosad Dogra, Heeseung Choi, and Ig-Jae Kim. Dyannet: A scene dynamicity guided self-trained video anomaly detection network. In Proceedings of the IEEE/CVF Winter Conference on Applications of Computer Vision, pp. 5541-5550, 2023.
Andrew Viterbi. Error bounds for convolutional codes and an asymptotically optimum decoding algorithm. IEEE transactions on Information Theory, 13(2):260-269, 1967.
Xiang Wang, Shiwei Zhang, Zhiwu Qing, Yuanjie Shao, Zhengrong Zuo, Changxin Gao, and Nong Sang. Oadtr: Online action detection with transformers. In Proceedings of the IEEE/CVF International Conference on Computer Vision, pp. 7565-7575, 2021.
Jhih-Ciang Wu, He-Yen Hsieh, Ding-Jie Chen, Chiou-Shann Fuh, and Tyng-Luh Liu. Self-supervised sparse representation for video anomaly detection. In Computer Vision-ECCV 2022: 17th European Conference, Tel Aviv, Israel, Oct. 23-27, 2022, Proceedings, Part XIII, pp. 729-745. Springer, 2022.
Guang Yu, Siqi Wang, Zhiping Cai, Xinwang Liu, Chuanfu Xu, and Chengkun Wu. Deep anomaly discovery from unlabeled videos via normality advantage and self-paced refinement. In Proceedings of the IEEE/CVF Conference on Computer Vision and Pattern Recognition, pp. 13987-13998, 2022.
M Zaigham Zaheer, Arif Mahmood, M Haris Khan, Mattia Segu, Fisher Yu, and Seung-Ik Lee. Generative cooperative earning for unsupervised video anomaly detection. In Proceedings of the IEEE/CVF Conference on Computer Vision and Pattern Recognition, pp. 14744-14754, 2022.
M Zaigham Zaheer, Arif Mahmood, Marcella Astrid, and Seung-Ik Lee. Claws: Clustering assisted weakly supervised earning with normalcy suppression for anomalous event detection. In Computer Vision-ECCV 2020: 16th European Conference, Glasgow, UK, Aug. 23-28, 2020, Proceedings, Part XXII 16, pp. 358-376. Springer, 2020.
Yuansheng Zhu, Wentao Bao, and Qi Yu. Towards open set video anomaly detection. In Computer Vision-ECCV 2022: 17th European Conference, Tel Aviv, Israel, Oct. 23-27, 2022, Proceedings, Part XXXIV, pp. 395-412. Springer, 2022.
Dimitri Zhukov, Jean-Baptiste Alayrac, Ramazan Gokberk Cinbis, David Fouhey, Ivan Laptev, and Josef Sivic. Crosstask weakly supervised learning from instructional videos. In Proceedings of the IEEE/CVF Conference on Computer Vision and Pattern Recognition, pp. 3537-3545, 2019.
Heng Wang and Cordelia Schmid. Action recognition with improved trajectories. In Proceedings of the IEEE International conference on computer vision, pp. 3551-3558, 2013.
Lichen Wang, Zhengming Ding, Zhiqiang Tao, Yunyu Liu, and Yun Fu. Generative multi-view human action recognition. In Proceedings of the IEEE/CVF International Conference on Computer Vision, pp. 6212-6221, 2019.
Zhenzhi Wang, Ziteng Gao, Limin Wang, Zhifeng Li, and Gangshan Wu. Boundary-aware cascade networks for temporal action segmentation. In European Conference on Computer Vision, pp. 34-51. Springer, 2020.
Bo Xiong, Haoqi Fan, Kristen Grauman, and Christoph Feichtenhofer. Multiview pseudo-labeling for semi-supervised learning from video. arXiv preprint arXiv:2104.00682, 2021.
Mingze Xu, Mingfei Gao, Yi-Ting Chen, Larry S Davis, and David J Crandall. Temporal recurrent networks for online action detection. In Proceedings of the IEEE/CVF International Conference on Computer Vision, pp. 5532-5541, 2019.
Mingze Xu, Yuanjun Xiong, Hao Chen, Xinyu Li, Wei Xia, Zhuowen Tu, and Stefano Soatto. Long short-term transformer for online action detection. arXiv preprint arXiv:2107.03377, 2021.
Christopher Zach, Thomas Pock, and Horst Bischof. A duality based approach for realtime tv-l 1 optical flow. In Joint pattern recognition symposium, pp. 214-223. Springer, 2007.
Bowen Zhang, Hao Chen, Meng Wang, and Yuanjun Xiong. Online action detection in streaming videos with time buffers. arXiv preprint arXiv:2010.03016, 2020.
Peisen Zhao, Lingxi Xie, Ya Zhang, Yanfeng Wang, and Qi Tian. Privileged knowledge distillation for online action detection. arXiv preprint arXiv:2011.09158, 2020.
K Deepak, G Srivathsan, S Roshan, and S Chandrakala. Deep multi-view representation learning for video anomaly detection using spatiotemporal autoencoders. Circuits, Systems, and Signal Processing, 40(3):1333-1349, 2021.

* cited by examiner

SYSTEM AND METHOD FOR PROVIDING WEAKLY-SUPERVISED ONLINE ACTION SEGMENTATION

CROSS-REFERENCE TO RELATED APPLICATION

This application claims priority to U.S. Provisional Application Ser. No. 63/278,001 filed on Nov. 10, 2021, which is expressly incorporated herein by reference.

BACKGROUND

Human action understanding from video, which involves recognizing, localizing, and forecasting human behavior is an important and widely studied problem in the quest for visual intelligence. Action understanding in videos is important in many applications where agents learn by observation of other agents performing complex tasks that often involve interactions with objects. Creating fully annotated clips with action assignments and labels on the temporal boundaries of individual actions is manually intensive and is therefore both time consuming and expensive. This limits the scale and practicality at which fully supervised video datasets may be created. Furthermore, the subjective nature of labeling start and end times of each action results in ambiguities for evaluation.

BRIEF DESCRIPTION

According to one aspect, a computer-implemented method for providing weakly-supervised online action segmentation that includes receiving image data associated with multi-view videos of a procedure. The procedure involves a plurality of atomic actions. The computer-implemented method also includes analyzing the image data using weakly-supervised action segmentation to identify each of the plurality of atomic actions by using an ordered sequence of action labels. The computer-implemented method additionally includes training a neural network with data pertaining to the plurality of atomic actions based on the weakly-supervised action segmentation. The computer-implemented method further includes executing online action segmentation to label atomic actions that are occurring in real-time based on the plurality of atomic actions trained to the neural network. At least one computing system is controlled to provide automation or feedback with respect to real-time atomic actions involved in completing the procedure based on the online action segmentation.

According to another aspect, a system for providing weakly-supervised online action segmentation that includes a memory storing instructions when executed by a processor cause the processor to receive image data associated with multi-view videos of a procedure. The procedure involves a plurality of atomic actions. The instructions also cause the processor to analyze the image data using weakly-supervised action segmentation to identify each of the plurality of atomic actions by using an ordered sequence of action labels. The instructions additionally cause the processor to train a neural network with data pertaining to the plurality of atomic actions based on the weakly-supervised action segmentation. The instructions further cause the processor to execute online action segmentation to label atomic actions that are occurring in real-time based on the plurality of atomic actions trained to the neural network. At least one computing system is controlled to provide automation or feedback with respect to real-time atomic actions involved in completing the procedure based on the online action segmentation.

According to yet another aspect, a non-transitory computer readable storage medium storing instruction that when executed by a computer, which includes a processor perform a method that includes receiving image data associated with multi-view videos of a procedure. The procedure involves a plurality of atomic actions. The method also includes analyzing the image data using weakly-supervised action segmentation to identify each of the plurality of atomic actions by using an ordered sequence of action labels. The method additionally includes training a neural network with data pertaining to the plurality of atomic actions based on the weakly-supervised action segmentation. The method further includes executing online action segmentation to label atomic actions that are occurring in real-time based on the plurality of atomic actions trained to the neural network. At least one computing system is controlled to provide automation or feedback with respect to real-time atomic actions involved in completing the procedure based on the online action segmentation.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
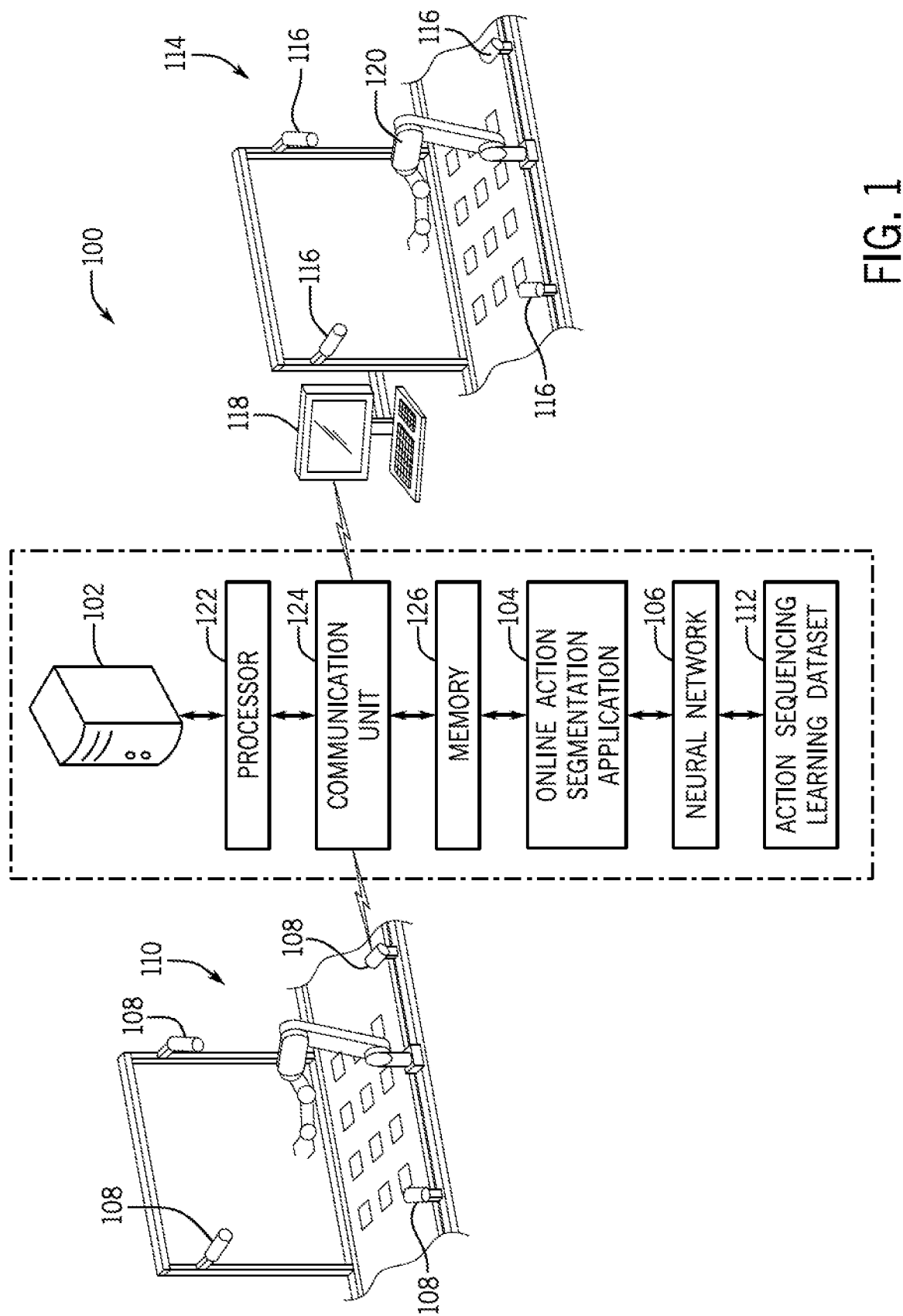
FIG. 1 is a schematic view of an exemplary operating environment for providing weakly-supervised online action segmentation according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discreet logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 is a schematic view of an exemplary operating environment 100 for providing weakly-supervised online action segmentation according to an exemplary embodiment of the present disclosure. The operating environment 100 includes a system that provides for the computer-implemented execution of weakly-supervised action segmentation methods use an ordered sequence of action labels for video clips. The ordered sequence of action labels is utilized for artificial intelligence training and forgoes using subjective labeling of start and end times of each action.

In an exemplary embodiment, the operating environment 100 may include an externally hosted server infrastructure (external server) 102 that is configured to execute an online action segmentation application 104. As discussed in more detail below, the online action segmentation application 104 may be configured to perform weakly-supervised online action segmentation with respect to one or more procedures.

The one or more procedures may include, but may not be limited to, assembly line procedures, cooking procedures, building procedures, manufacturing procedures, mechanical procedures, vehicular autonomous control procedures, procedural steps, and the like. Each respective procedure may include one or more process steps that may be completed to accomplish an end goal/result of the respective procedure. In an exemplary embodiment, during a training mode of the application 104, the online action segmentation application 104 may be configured to determine and identify a plurality of atomic actions that may be included as part of each of the process steps that may be completed by one or more individuals (e.g., human), one or more human controlled machines (e.g., human controlled robotic machinery), and/or one or more autonomously controlled apparatuses (e.g., robots, machinery, vehicles, medical tools, automotive tools, etc.). The plurality of atomic actions may be identified as physical, virtual, and/or interactive actions that are sequentially conducted to accomplish an end goal/result of a respective procedure. As discussed below, the plurality of atomic actions may be determined through the analysis of multiple-view (multi-view) video of the respective procedure.

Upon determining and identifying the plurality of atomic actions that may be conducted by one or more individuals, the online action segmentation application 104 may be configured to train a neural network 106 during a training mode of the application 104. The neural network 106 may be trained with data points that are associated with each of a plurality of atomic actions that may conducted (sequentially) to accomplish an end goal/result of a particular procedure. In particular, during the training mode, the online action segmentation application 104 may be configured to utilize multiple image sensors (cameras) 108 that may be located within the training environment 110 to capture multi-view videos of the training environment 110.

The training environment 110 may include, but may not be limited to an environment in which a respective procedure is completed and the end goal/result of the procedure is accomplished and captured by the cameras 108 to train the neural network 106. The training environment 110 may be an environment that a plurality of atomic actions of a respective procedure are completed to accomplish the end goal/result of the respective procedure to train the neural network 106 using multi-view weakly-supervised training. For example, the training environment 110 may include an assembly line environment, a cook line environment, a manufacturing environment, a workplace environment, a laboratory environment, a simulated environment, and the like in which a respective procedure may take place within the training mode of the online action segmentation application 104 to train the neural network 106 with respect to the plurality of atomic actions.

The multi-view videos of the training environment 110 may include a plurality of views of a plurality of atomic actions that may be conducted in order to complete a particular procedure. The online action segmentation application 104 may be configured to utilize multi-view videos to capture procedures with robustness that are less susceptible to issues that pertain to particular camera occlusion, poor lighting conditions, and/or scene variations. The online action segmentation application 104 may also be configured to exploit framewise correspondence between multiple views as supervision for training without requiring pre-labeled datasets.

As discussed below, the online action segmentation application 104 may utilize weakly-supervised action segmentation by using an ordered sequence of action labels that pertain to each of the plurality of atomic actions that are determined and identified during the training mode. The online action segmentation application 104 does not require temporal assignment (start and end time) and may avoid the ordering of constraints which are manually intensive, time consuming, and expensive.

In one embodiment, the online action segmentation application 104 may be configured to determine and label each of a plurality of atomic actions and data that may associated with each of the plurality of atomic actions that may be included within each of the process steps of the procedure. The determination of each of the plurality of atomic actions may include determining a sequence of the plurality of atomic actions that may be completed to accomplish the procedure. Upon determining each of the plurality of atomic actions, data that may associated with each of the plurality of atomic actions, and the sequence of the plurality of atomic actions that may be completed to accomplish the procedure, the online action segmentation application 104 may be configured to train the neural network 106.

The training of the neural network 106 may be completed by adding data points that are respectively associated with each of the plurality of atomic actions that may be included as part of respective process steps that are required to complete a particular procedure to an action sequencing learning dataset 112 of the neural network 106. The training of the neural network 106 may also include adding data points that may be associated with the sequence of the plurality of atomic actions that may be completed to accomplish the end goal/result of the procedure to the action sequencing learning dataset 112 of the neural network 106.

The training of the neural network 106 during the training mode of the online action segmentation application 104 may enable the online action segmentation application 104 to implement an execution mode. Within the execution mode, the online action segmentation application 104 may provide artificial intelligence-based guidance, feedback, and/or instructions to allow each respective procedure to be completed with the real-time computer implemented online action understanding of atomic actions that may take place in real time. During the execution mode, the procedure may be executed in real time based on the execution of particular atomic actions by one or more individuals, one or more human controlled machines, and/or one or more autonomously controlled apparatuses towards accomplishment an end goal/result of a particular procedure. Accordingly, the execution mode may involve a real-time implementation of atomic actions that may be conducted by one or more individuals, one or more human controlled machines, and/or one or more autonomously controlled apparatuses to complete process steps that may be involved in the accomplishment of a particular procedure.

In one embodiment, the execution mode of the online action segmentation application 104 may be implemented during the real-time implementation of a procedure by one or more individuals, one or more human controlled machines, and/or one or more autonomously controlled apparatuses within an execution environment 114. The execution environment 114 may include, but may not be limited to an environment in which a respective procedure is completed in real-time and the end goal/result of the procedure is accomplished and captured in real-time by the multiple image sensors (cameras) 116 that may be located within the execution environment 114. For example, the execution environment 114 may include an assembly line environment, a cook line environment, a manufacturing environment, a workplace environment, a laboratory environment, a simulated environment, and the like in which a respective procedure may take place in real-time subsequent to the training of the neural network 106 by the online action segmentation application 104.

In particular, the online action segmentation application 104 may be configured to receive image data of videos taken of the real-time implementation of the procedure that may be captured by cameras 116 that may be located within the execution environment 114. The image data may include data associated with single view or multi-view video of the execution environment 114 that captures the implementation of a plurality of real-time atomic actions that may be implemented to complete the particular procedure.

In an exemplary embodiment, the online action segmentation application 104 may be configured to execute online action segmentation that may be utilized to determine and identify each particular atomic action based on machine learning deep learning techniques of the trained neural network 106. In particular, during the execution mode, the online action segmentation application 104 may be configured to determine when and which atomic action(s) in the sequence of the plurality of atomic actions of a respective procedure is started in real-time, is in the process or being completed in real-time, and/or has been completed to provide artificial intelligence-based guidance, feedback, and/or instructions. The functionality of providing artificial intelligence-based guidance, feedback, and/or instructions may enable each respective procedure to be completed with the real-time computer implemented online action understanding of atomic actions towards the accomplishment of an end goal/result of particular procedures as previously trained to the neural network 106 during the training mode of the online action segmentation application 104.

In an exemplary embodiment, the online action segmentation application 104 may be configured to utilize the neural network 106 to utilize machine learning deep learning techniques to use online segmentation to segment video captured on the real-time implementation of one or more atomic actions within the execution environment 114 using dynamic programming without having any access to future frames. In other words, the online segmentation may be completed in real-time without requiring access to and analysis of an entire video that includes past, present, and future frames of an implementation and completion of a particular procedure that may be traditionally be used in an offline setting. Accordingly, the execution of online action segmentation by the online action segmentation application 104 may be utilized to identify particular action labels that may be associated with real-time atomic actions that may take place during the real-time implementation of a particular procedure based on a set of action labels that have been previously trained to the neural network 106 during the training mode using weakly-supervised action segmentation by the online action segmentation application 104.

The online action segmentation application 104 provides an improvement to a computer and technology with respect to video-based action training and identification by enabling a weakly-supervised training of data associated with atomic actions through limited annotation and the determination of real-time data based on the online analysis of action labels. The online action segmentation application 104 may additionally offer dynamic programming to provide weakly-supervised online action segmentation to generate accurate action pseudo-ground-truth in weakly labeled videos without additional annotation cost, utilization of high amount of processing power, and/or high amounts of storage utilization. The functionality of the online action segmentation application 104 allows for minimal training time, identification time, and manual effort on the part of human annotators. The functionality may also eliminate any time, effort, and allocation of resources that may devoted toward offline video recording and offline video playback that may be traditionally be used in an offline setting.

In one or more embodiments, upon the identification of each real-time atomic action, the online action segmentation application 104 may be configured to output instructions to electronically control one or more computing systems to provide feedback with respect to real-time atomic actions involved in completing the particular procedure. In one configuration, the online action segmentation application 104 may be configured to control a computing system 118 that may be located within the execution environment 114.

The computing system 118 may be controlled by the online action segmentation application 104 to provide a human machine interface (HMI) feedback to an individual with respect to the completion of a particular atomic action that may be involved in a sequence of a plurality of atomic actions in the completion of a particular procedure. The computing system 118 may also be controlled to provide an HMI that may provide instructions to the individual in real-time regarding a next atomic action that should take place in a particular procedure, one or more anomalies that may be determined as one or more individuals complete respective atomic actions, one or more anomalies that may be determined as one or more human controlled machines complete respective atomic actions, and/or one or more anomalies that may be determined as one or more autonomously controlled apparatuses completes respective atomic actions. Accordingly, the online action segmentation application 104 may provide a user (e.g., individual, entity) with a real-time feedback during the implementation of a procedure to guide, assist, and/or direct the user towards completion of the particular procedure.

In another configuration, the online action segmentation application 104 may be configured to control an autonomous apparatus 120 (e.g., robotic apparatus, manufacturing apparatus, vehicular apparatus, medical apparatus, etc.) that may be located within the execution environment 114. The autonomous apparatus 120 may be controlled to autonomously perform one or more atomic actions that may be required to complete a particular procedure. The autonomous apparatus 120 may be controlled to autonomously perform atomic actions that may start a procedure, continue a procedure based on the trained sequence of atomic actions, and/or complete a procedure based on the trained sequence of atomic actions (e.g., trained during the training mode of the application 104).

Accordingly, the online action segmentation application 104 may be utilized with respect to the training and providing real-time artificial intelligence-based guidance, feedback, and/or control with respect to the completion of particular atomic actions that are required to complete one or more procedures. As a non-limiting illustrative example, the training mode of the online action segmentation application 104 may be utilized to capture multi-view videos of the training environment 110 that may be configured an assembly line that may be used to complete a vehicle assembly procedure. Each step in the assembly line may include one or more atomic actions that may pertain to the completion the procedure of assembling the vehicle.

Within the training mode, the online action segmentation application 104 may be configured to train the neural network 106 with respect to each of the plurality of atomic actions that may pertain to the completion of process steps that are included to complete the vehicle assembly procedure based on the utilization of weakly-supervised action segmentation. The online action segmentation application 104 may use an ordered sequence of action labels that pertain to each of the plurality of atomic actions during the training mode. For non-limiting exemplary purposes, such labels may pertain to sequential order of action labels that pertain to welding of structural pieces to complete a vehicle frame and chassis, attachment of vehicle doors to the vehicle frame, attachment of vehicle body panels, installment of mechanical components, installment of electrical components, and the attachment of wheels and tires to accomplish the end goal of vehicle assembly.

During the execution mode, the online action segmentation application 104 may subsequently be utilized to provide one or more commands to the computing system 118 that may be configured as an automation controller to control the autonomous apparatus 120 that may be configured as a mechanical assembly line robotic apparatus. The commands may be based on the real-time identification of atomic actions that may be completed to perform one or more process steps during the execution of the vehicle assembly procedure. The online action segmentation application 104 may send and receive data to and from the neural network 106 to utilize machine learning deep learning techniques to use online segmentation to segment video captured of the real-time implementation of one or more atomic actions of the vehicle assembly procedure.

The online action segmentation application 104 may be configured to identify particular action labels that may be associated with real-time atomic actions that may pertain to each of the steps of the vehicle assembly procedure based on a set of action labels that are trained to the neural network 106 (due to the prior addition of data points to the action sequencing learning dataset 112 during the training mode of the online action segmentation application 104). Accordingly, upon determining one or more particular atomic actions are completed, the online action segmentation application 104 may be configured to send one or more commands to electronically control the autonomous apparatus 120 to perform one or more subsequent atomic actions to complete subsequent manufacturing steps towards completion of the vehicle assembly procedure.

For non-limiting exemplary purposes, upon the completion of an atomic action(s) with respect to the attachment of vehicle doors to the vehicle frame by the autonomous apparatus 120, the online action segmentation application 104 may utilize online segmentation to segment video captured on the real-time implementation of one or more atomic actions of the vehicle assembly procedure to identify the completion of the atomic action(s) pertaining to the attachment of vehicle doors to the vehicle frame. Accordingly, the online action segmentation application 104 may be configured to send one or more commands to the computing system 118 to control the autonomous apparatus 120 to complete one or more atomic actions such as changing positions, configurations, and/or moving particular components that may be completed to complete the next sequential step of attaching vehicle body panels in real-time. This functionality may allow the autonomous apparatus 120 to be autonomously controlled to perform one or more particular atomic actions required to attach the vehicle body panels to the frame of the vehicle as the next sequential process step towards completion of the end goal/result of vehicle assembly procedure. The online action segmentation application 104 may also be configured to provide a feedback HMI to an individual through the computing system 118 with respect to a real-time status of the plurality of atomic actions based on the trained sequence of atomic actions to complete the vehicle assembly procedure.

With continued reference to FIG. 1, the external server 102 may be operably controlled by a processor 122 that may be configured to execute the online action segmentation application 104. In particular, the processor 122 may be configured to execute one or more applications, operating systems, database, and the like. The processor 122 may also include internal processing memory, an interface circuit, and bus lines for transferring data, sending commands, and communicating with the plurality of components of the external server 102.

The processor 122 may be operably connected to a communication unit 124 of the external server 102. The communication unit 124 may include one or more network interface cards (not shown) that may be configured to connect to one or more computing systems through an internet cloud (not shown). In particular, the communication unit 124 may be configured to provide secure communications between the external server 102, a computing system(s) (not shown) that may be located within the training environment 110, the cameras 108 that may be located within the training environment 110, the computing system 118 that may be located within the execution environment 114, the cameras 116 that may be located within the execution environment 114, the autonomous apparatus 120 that may be located within the execution environment 114, and/or an automation controller (not shown) that may be executed upon the computing system 118 that may be located within the execution environment 114.

The communication unit 124 may be configured to ensure secure communication of data between computing and electronic systems of the training environment 110 to send/receive data to/from the training environment 110 to the online action segmentation application 104 and the neural network 106 stored upon the external server 102 through the internet cloud. Additionally, the communication unit 124 may be configured to ensure secure communication of data between computing and electronic systems of the execution environment 114 to send/receive data to/from the execution environment 114 to the online action segmentation application 104 and the neural network 106 stored upon the external server 102 through the internet cloud.

In one embodiment, the processor 122 may be operably connected to a memory 126 of the external server 102. Generally, the processor 122 may communicate with the memory 126 to execute the one or more applications, operating systems, and the like that are stored within the memory 126. In one embodiment, the memory 126 may store one or more executable application files that are associated with the online action segmentation application 104. In an exemplary embodiment, the memory 126 of the external server 102 may be configured to store the neural network 106.

In one embodiment, the neural network 106 may be configured as a convolutional recurrent neural network (CNN). As an CNN, the neural network 106 may execute machine learning/deep learning techniques to process and analyze sequences of data points such as image data associated with multi-view videos that may be captured by the cameras 108 within the training environment 110 and/or the cameras 116 within the execution environment 114. In an exemplary embodiment, the neural network 106 may be trained based on weakly-supervised action segmentation by using an ordered sequence of action labels that pertain to each of the plurality of atomic actions that are captured in multi-view videos by the cameras 108 within the training environment 110.

The neural network 106 may be trained with data points that are associated with each of a plurality of atomic actions that may conducted (sequentially) to accomplish an end goal/result of a particular procedure. The data points associated with the particular procedure may be trained by populating the datapoints to the action sequencing learning dataset 112 of the neural network 106.

II. The Online Action Segmentation Application and Related Methods

Components of the online action segmentation application 104 will now be described according to an exemplary embodiment and with continued reference to FIG. 1. In an exemplary embodiment, the online action segmentation application 104 may be stored on the memory 126 and executed by the processor 122 of the external server 102. In another embodiment, the online action segmentation application 104 may be stored upon a memory of a computing system that may be located within the training environment 110 and/or the computing system 118 that may be located within the execution environment 114 and may be accessed by the communication unit 124 of the external server 102 to be executed by the processor 122 of the external server 102.

Figure 2:
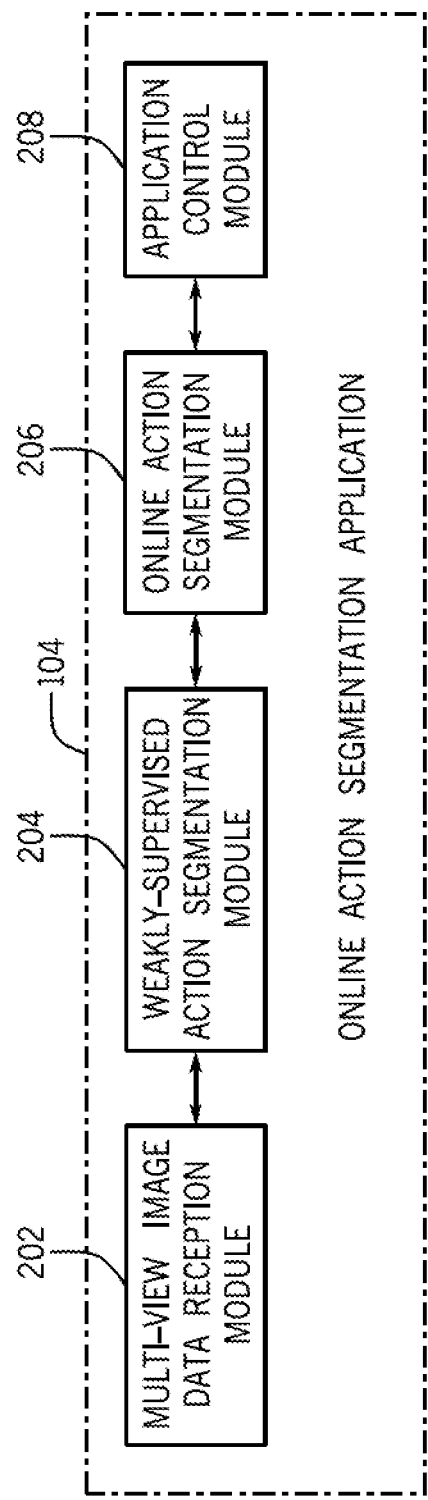
FIG. 2 is a schematic overview of an online action segmentation application according to an exemplary embodiment of the present disclosure.

FIG. 2 is a schematic overview of the online action segmentation application 104 according to an exemplary embodiment of the present disclosure. In an exemplary embodiment, the online action segmentation application 104 may include a plurality of modules 202-208 that may be configured to provide weakly-supervised online action segmentation. The plurality of modules 202-208 may include a multi-view image data reception module (data reception module) 202, a weakly-supervised action segmentation module (action segmentation module) 204, an online action segmentation module (online segmentation module) 206, and an application control module 208. However, it is appreciated that the online action segmentation application 104 may include one or more additional modules and/or sub-modules that are included in lieu of the modules 202-208.

Figure 3:
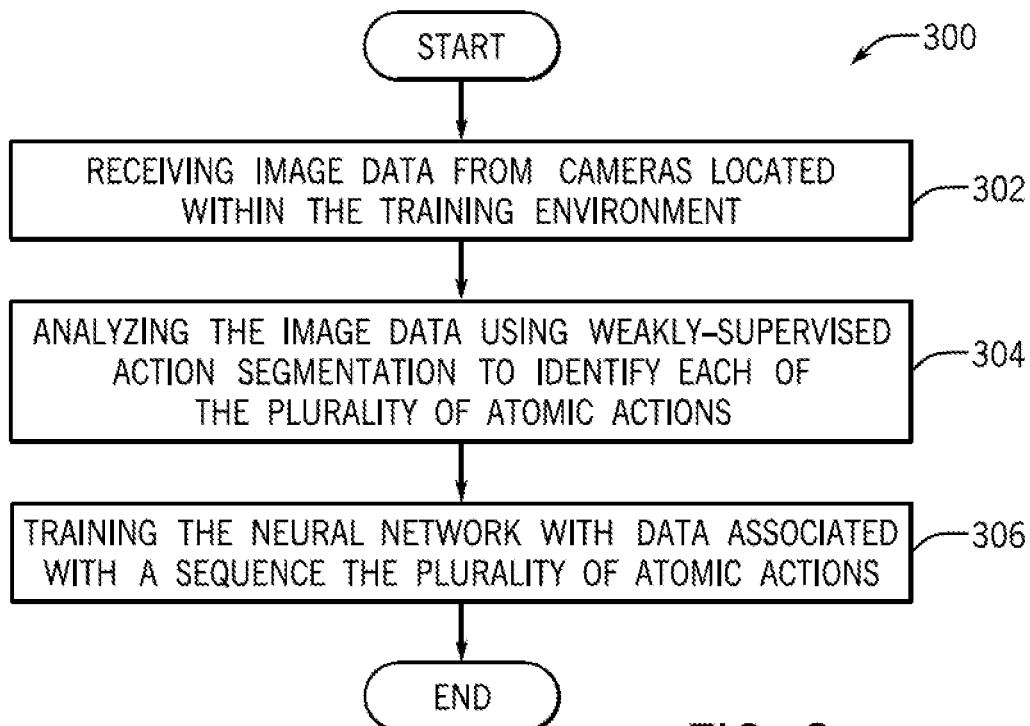
FIG. 3 is a process flow diagram of a method for training a neural network with respect to a plurality of atomic actions of a procedure within a training mode of the online action segmentation application according to an exemplary embodiment of the present disclosure.

FIG. 3 is a process flow diagram of a method 300 for training the neural network 106 with respect to a plurality of atomic actions of a procedure within the training mode of the online action segmentation application 104 according to an exemplary embodiment of the present disclosure. FIG. 3 will be described with reference to the components of FIG. 1 though it is to be appreciated that the method 300 of FIG. 3 may be used with other systems/components. The method 300 may begin at block 302, wherein the method 300 may include receiving image data from cameras 108 located within the training environment 110.

In one embodiment, the data reception module 202 of the online action segmentation application 104 may be configured to communicate with the cameras 108 to collect image data associated untrimmed videos that are capture multiple-views of the training environment 110 by the cameras 108. The multi-view videos may be captured at one or more points in time during the starting, duration, and/or ending of a particular procedure (e.g., vehicle assembly procedure, a cooking line procedure, medical procedure, etc.). Accordingly, the multi-view videos may capture one or more atomic actions that may be conducted by one or more individuals, one or more human controlled machines, and/or one or more autonomously controlled apparatuses that are conducted towards accomplishing the end goal/result of the particular procedure.

In one embodiment, upon receipt of the image data that are associated with multi-view videos of the procedure being completed within the training environment 110, the data reception module 202 may be configured to communicate the image data to the action segmentation module 204. Accordingly, the image data associated with the multi-view videos of the atomic actions being conducted to accomplish the procedure are received by the action segmentation module 204 of the online action segmentation application 104.

The method 300 may proceed to block 304, wherein the method 300 may include analyzing the image data using weakly-supervised action segmentation to identify each of the plurality of atomic actions. In an exemplary embodiment, upon receipt of the image data, the action segmentation module 204 may be configured to analyze the image data using an ordered sequence of action labels that pertain to each of the plurality of atomic actions that are captured within the multi-view videos of the training environment 110. In particular, the action segmentation module 204 may utilize weakly-supervised online action segmentation of the multi-view videos that do not require the use of labels of start and end times with respect to each of the plurality of atomic actions and of the procedure.

In one configuration, within the training mode, the input to the model is multi-view videos of length T represented by frame-level features $x_1^T$ and an ordered sequence of atomic actions $\tau=(\tau_1, \tau_2 \ldots \tau_M)$ known as the transcript. M is the number of atomic actions in a given video and can vary across multi-view videos. Information about the start and end time of each action is not known. Given the set of action labels in the dataset A, the goal of the application 104 is to identify the action label $a_t \in A$ at frame t for all $0<t<T+1$ within the execution mode based on only the past and current observations $x_1^t$.

In one embodiment, in order to fully account for past atomic actions and their duration, the action segmentation module 204 may formulate a marginal causal (or online) probability $p_{on}(a_{t'}|x_1^{t'})$ of the present atomic action $a_{t'}=a_{n(t')}$ at segment $n'=n(t')$ over all previous actions $a_1^{n'-1}$ if $n'>1$ and duration $l_1^{n'}$. The inferred present atomic action $a_{\tilde{t}}$ is derived as follows:

$$a'_t = \text{argmax}\{p_{on}(a_{t'} \mid x_1^{t'})\} = \text{argmax}\left\{\sum_{a_1^{n'-1}, l_1^{n'}} p_{on}(a_1^{n'}, l_1^{n'} \mid x_1^{t'})\right\}$$

In one embodiment, to improve computational efficiency, the action segmentation module 204 may be configured to empirically approximate the aforementioned equation by the maximum join probability value:

$$a_t \approx \text{argmax}\{\max\ p_{on}(a_1^n, l_1^n \mid x_1^{t'})\}$$

which may involve two steps. The first is to find the most likely sequence of actions $\tilde{a}_1^{n'}$ with duration $\tilde{l}_1^{n'}$ until time t' The second involves taking only the last segment label $\tilde{a}_n = \text{pop}(\tilde{a}_1^{n'})$ to infer the label of the current frame t', where pop ( ) is a function that outputs the last element of a list. To execute the first step, online inference of the most likely sequence of past action segments $(\tilde{a}_1^{n'}, \tilde{l}_1^{n'})$ is formulated as argmax $\{p_{on}(a_1^{n'}, l_1^{n'}|x_1^{t'})\}$, where $p_{on}(a_1^{n'}, l_1^{n'}|x_1^{t'})$ for $n'>1$ is derived as:

$$p_{on}(a_1^{n'}, l_1^{n'} \mid x_1^{t'}) = \Gamma(l_{n'} \mid a_{n'})\prod_{t=1}^{t'} p(x_t \mid a_{n(t)})\prod_{n=1}^{n'-1} p(l_n \mid a_n) \cdot p(a_1^{n'})$$

where $p(a_1^{n'})=1$ if $a_1^{n'}$ is a subsequence of any of the transcripts in the training set, and 0 otherwise, and $\Gamma(l|a)$ is a half Poisson function to model the duration $l_{n'}$ of the current action $a_{n'}$ at the last observed segment, given by $$\Gamma(l|a) = \begin{cases} \dfrac{1\lambda_a^l \exp(-\lambda_a)}{l!} & \text{if 1 otherwise} \end{cases}$$

where $\lambda_a$ is the estimated mean length of action a.

Inclusion of $\gamma(\ )$ in the online inference of the current action may account for the two following cases. First, using a full Poisson distribution to model the duration of the current observed atomic action leads to penalizing the current atomic actions with a short duration, $l_{n'} < \lambda_{a_{n'}}$. Second, $\gamma(\ )$ enables penalization of the current action if its duration is longer than expected since this can be concluded solely based on the observed segment of the atomic action.

With continued reference to the method 300 of FIG. 3, the method 300 may proceed to block 306, wherein the method 300 may include training the neural network 106 with data associated with a sequence of the plurality of atomic actions. In an exemplary embodiment, upon analyzing the image data using the weakly-supervised online action segmentation to identify each of the plurality of atomic actions of the respective procedure, the action segmentation module 204 may access the memory 126 of the external server 102 to train the neural network 106.

In one embodiment, the action segmentation module 204 may be configured to access the neural network 106 and may update the action sequencing learning dataset 112 with the data points that are respectively associated with each of the plurality of atomic actions that may be included as part of respective process steps that are required to complete the particular procedure to an action sequencing learning dataset 112 of the neural network 106. The training of the neural network 106 may also include adding data points that may be associated with the sequence of the plurality of atomic actions that may be completed to accomplish the end goal/result of the procedure to the action sequencing learning dataset 112 of the neural network 106.

A final result that is trained to the neural network 106 as the datapoints that are populated upon the action sequencing learning dataset 112 include a sequence of N predicted segments identified online by their action $a_n$ and duration $l_n$, where n refers to the $n_{th}$ segment. Accordingly, the neural network 106 may be trained based on weakly-supervised action segmentation by using an ordered sequence of action labels that pertain to each of the plurality of atomic actions that are captured in multi-view videos by the cameras 108 within the training environment 110.

Figure 4:
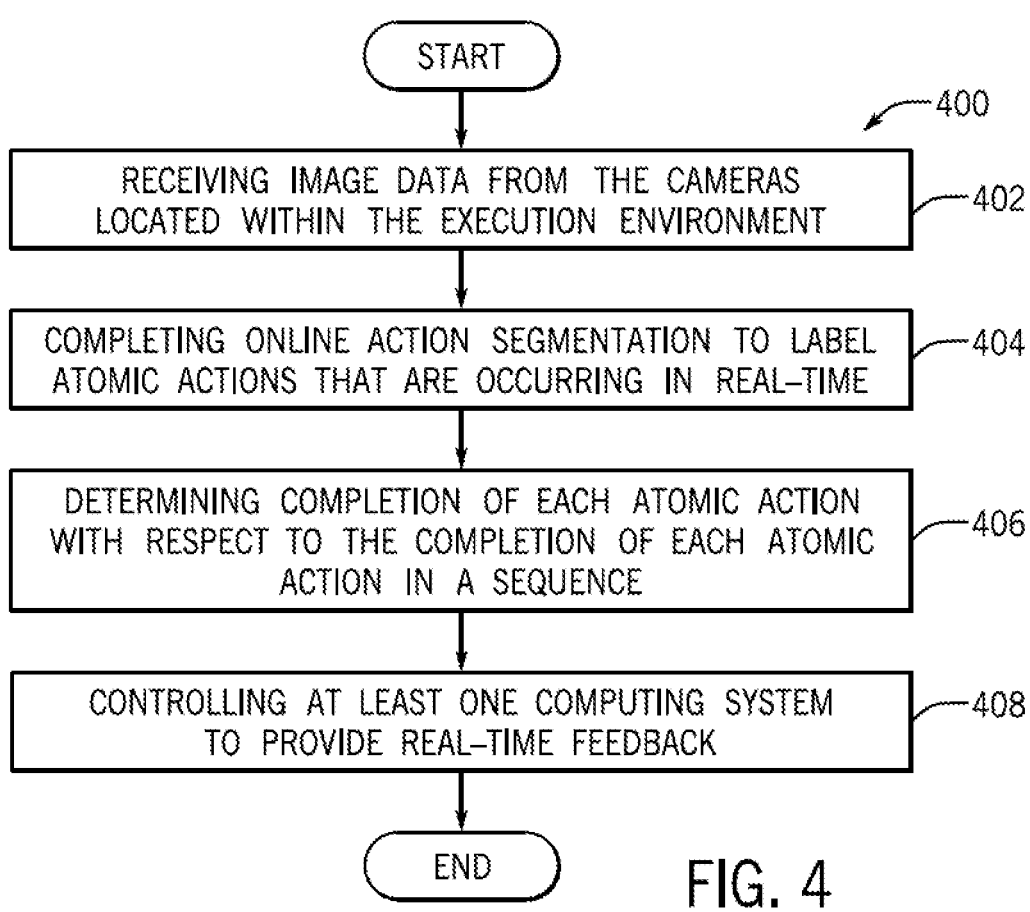
FIG. 4 is a process flow diagram of a method for completing online action segmentation to label atomic actions that are occurring in real-time according to an exemplary embodiment of the present disclosure.

FIG. 4 is a process flow diagram of a method 400 for completing online action segmentation to label atomic actions that are occurring in real-time according to an exemplary embodiment of the present disclosure. FIG. 4 will be described with reference to the components of FIG. 1 though it is to be appreciated that the method 400 of FIG. 4 may be used with other systems/components. The method 400 may begin at block 402, wherein the method 400 may include receiving image data from the cameras 116 located within the execution environment 114.

In an exemplary embodiment, during the execution mode of the online action segmentation application 104, the data reception module 202 of the online action segmentation application 104 may be configured to communicate with the cameras 116 within the execution environment 114 to collect image data associated untrimmed videos that are capture multiple-views of the training environment 110 by the cameras 108. The multi-view videos may be captured at one or more points in time during the starting, duration, and/or ending of a particular procedure (e.g., vehicle assembly procedure, a cooking line procedure, medical procedure, etc.). Accordingly, the multi-view videos may capture one or more atomic actions that may be conducted in real-time within the execution environment 114 by one or more individuals, one or more human controlled machines, and/or one or more autonomously controlled apparatuses that are conducted towards accomplishing the end goal/result of the particular procedure.

In one embodiment, upon receipt of the image data that are associated with multi-view videos of the procedure being completed within the execution environment 114, the data reception module 202 may be configured to communicate the image data to the online segmentation module 206 of the online action segmentation application 104. Accordingly, the image data associated with the multi-view videos of the real-time atomic actions being conducted to accomplish the procedure within the execution environment 114 are received by the action segmentation module 204 of the online action segmentation application 104.

The method 400 may proceed to block 404, wherein the method 400 may include completing online action segmentation to label atomic actions that are occurring in real-time. In an exemplary embodiment, during the execution mode, the action segmentation module 204 may be configured to analyze the image data using an ordered sequence of action labels that pertain to each of the plurality of atomic actions that are captured within the multi-view videos of the execution environment 114.

In particular, a final online segmentation result in a streaming video when the current time t' changes from 1 to any given time T is the sequence of frame-level actions $(\hat{a}1, \ldots, \hat{a}T)$, where each $\hat{a}_t \leftarrow \tilde{a}_n =_{pop}(\tilde{a}_1^{n'})$ is inferred by:

$$\Gamma(l_{n'}|a_{n'})\prod_{t=1}^{t'} p(x_t|a_{n(t)}) \prod_{n=1}^{n'-1} p(l_n|a_n) \cdot p(a_1^{n'})$$

$p=(a_1^{n'})=1$ if $a_1^{n'}$ is a sub-sequence of any of the transcripts in the training set, and 0 otherwise, and $\Gamma(l|a)$ is a half Poisson function to model the duration $l_{n'}$ of the current action $a_{n'}$ at the last observed segment, given by $$\Gamma(l|a) = \begin{cases} \dfrac{1}{\dfrac{\lambda_a^l \exp(-\lambda_a)}{l!}} & \text{if } l < \lambda_a \text{ otherwise} \end{cases}$$

where $\lambda_a$ is the estimated mean length of action a.

The method 400 may proceed to block 406, wherein the method 400 may include determining completion of each atomic action with respect to the completion of each atomic action in a sequence. In one embodiment, during the execution mode, the action segmentation module 204 may label the current atomic action $\alpha_{n'}$ that may be occurring towards the achievement of the end goal/result of the procedure in an online fashion without having access to future frames. The action segmentation module 204 may be configured to communicate with the neural network 106 to determine if the current atomic action $\alpha_{n'}$ is conducted during the starting, duration, and/or ending of a particular procedure (e.g., vehicle assembly procedure, a cooking line procedure, medical procedure, etc.) based on data points that have been previously added to the action sequencing learning dataset 112 that may be associated with the sequence of the plurality of atomic actions that may be completed to accomplish the end goal/result of the respective procedure to the action sequencing learning dataset 112 of the neural network 106.

In an exemplary embodiment, the action segmentation module 204 may be configured to determine if there is a subsequent atomic action in a sequence of the plurality of atomic actions that are required to be conducted towards the accomplishment of an end goal/result of the respective procedure. If it is determined that there is a subsequent atomic action to the current atomic action $a_{n'}$ that is being conducted in the sequence of the plurality of atomic actions, the action segmentation module 204 may be configured to retrieve data points that are associated with the subsequent atomic action from the neural network 106.

As an illustrative example, during the completion of the vehicle assembly procedure, a sequential order of action labels may include welding of structural pieces to complete a vehicle frame and chassis, attachment of vehicle doors to the vehicle frame, attachment of vehicle body panels, installment of mechanical components, installment of electrical components, and the attachment of wheels and tires to accomplish the end goal of vehicle assembly. If the current atomic action $a_{n'}$ in the vehicle assembly procedure is installment of electrical components, it maybe determined that the subsequent atomic action in a sequence of the plurality of atomic actions that are required to be conducted towards the accomplishment of an end goal/result of the vehicle assembly procedure includes the attachment of wheels and tires to accomplish the end goal of vehicle assembly.

In one or more embodiments, upon retrieving data points that are associated with the atomic action from the neural network 106, the action segmentation module 204 may be configured to communicate data pertaining to the subsequent atomic action to the application control module 208 of the online action segmentation application 104. In an exemplary embodiment, the application control module 208 may be configured to communicate one or more commands to the computing system 118 that may be configured as an automation controller to control the autonomous apparatus 120 to autonomously complete the subsequent atomic action towards the accomplishment of an end goal/result of the procedure.

Referring again to the aforementioned example, if the subsequent atomic action in a sequence of the plurality of atomic actions that are required to be conducted towards the accomplishment of an end goal/result of the vehicle assembly procedure includes the attachment of wheels and tires to accomplish the end goal of vehicle assembly, the application control module 208 may be configured to send one or more commands to electronically control the autonomous apparatus 120 within the execution environment 114 to perform the subsequent atomic action(s) to the current atomic action of attaching the wheels and tires to complete the vehicle assembly procedure.

In another embodiment, in addition to or in lieu of communicating commands to autonomously control the autonomous apparatus 120 to complete a subsequent atomic action(s) towards accomplishing the procedure, the application control module 208 may be configured to send one or more commands to electronically control the computing system 118 to provide feedback to an individual with respect to the completion of the subsequent atomic action(s) that may be involved in a sequence of a plurality of atomic actions in the completion of the procedure. The computing system 118 may also be controlled to provide an HMI that may provide instructions to the individual in real-time regarding a next atomic action that should take place in a particular procedure, one or more anomalies that may be determined as one or more individuals complete respective atomic actions, one or more anomalies that may be determined as one or more human controlled machines complete respective atomic actions, and/or one or more anomalies that may be determined as one or more autonomously controlled apparatuses completes respective atomic actions. Accordingly, the online action segmentation application 104 may provide the user with a real-time feedback during the implementation of a procedure to guide, assist, and direct the user towards completion of the particular procedure.

Figure 5:
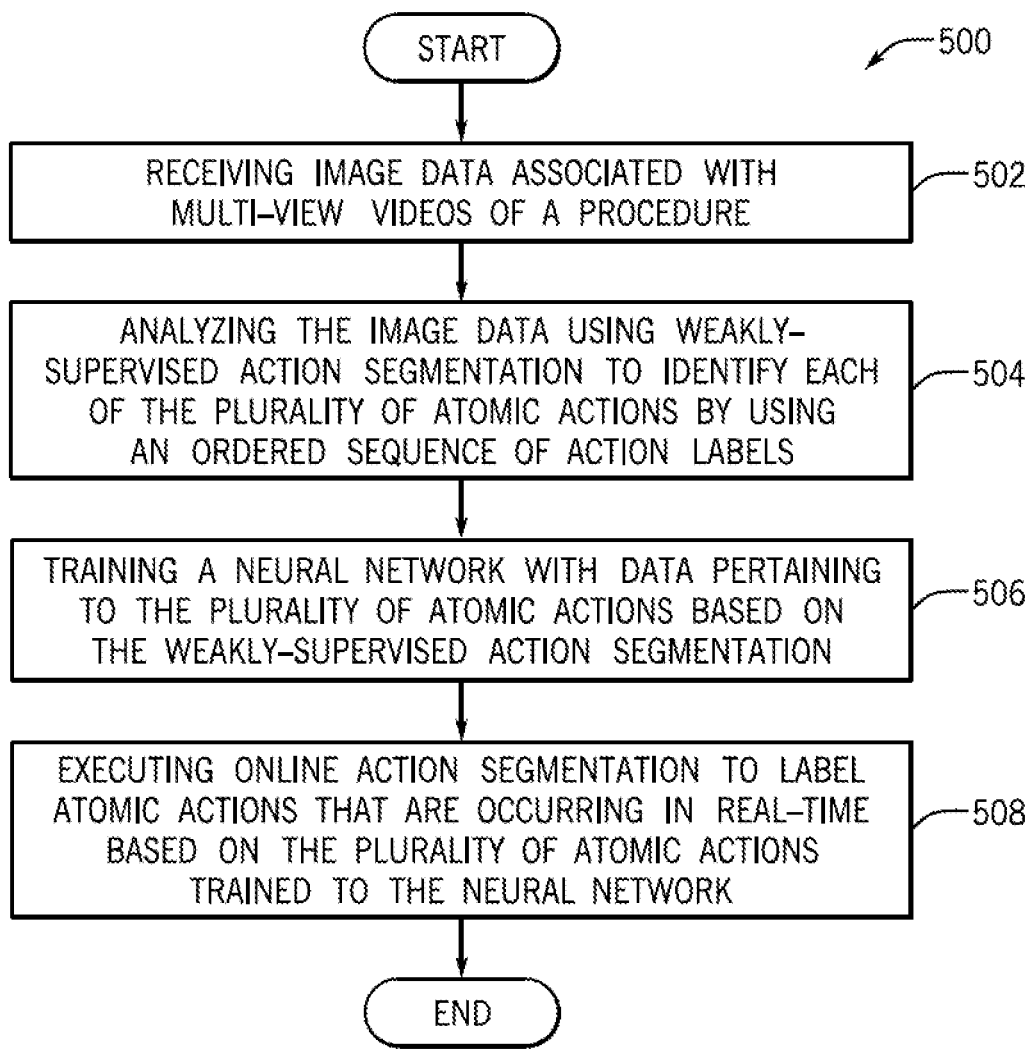
FIG. 5 is a process flow diagram of a method for providing weakly-supervised online action segmentation according to an exemplary embodiment of the present disclosure.

FIG. 5 is a process flow diagram of a method 500 for providing weakly-supervised online action segmentation according to an exemplary embodiment of the present disclosure. FIG. 5 will be described with reference to the components of FIG. 1 though it is to be appreciated that the method 500 of FIG. 5 may be used with other systems/components. The method 500 may begin at block 502, wherein the method 500 may include receiving image data associated with multi-view videos of a procedure. In one embodiment, the procedure involves a plurality of atomic actions.

The method 500 may proceed to block 504, wherein the method 500 may include analyzing the image data using weakly-supervised action segmentation to identify each of the plurality of atomic actions by using an ordered sequence of action labels. The method 500 may proceed to block 506, wherein the method 500 may include training a neural network 106 with data pertaining to the plurality of atomic actions based on the weakly-supervised action segmentation. The method 500 may proceed to block 508, wherein the method 500 may include executing online action segmentation to label atomic actions that are occurring in real-time based on the plurality of atomic actions trained to the neural network 106. In one embodiment, at least one computing system is controlled to provide automation or feedback with respect to real-time atomic actions involved in completing the procedure based on the online action segmentation.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for providing weakly-supervised online action segmentation comprising:
   receiving image data associated with multi-view videos of a procedure, wherein the procedure involves a plurality of atomic actions;
   analyzing the image data using weakly-supervised action segmentation to identify each of the plurality of atomic actions by using an ordered sequence of action labels;
   training a neural network with data pertaining to the plurality of atomic actions based on the weakly-supervised action segmentation; and
   executing online action segmentation to label atomic actions that are occurring in real-time based on the plurality of atomic actions trained to the neural network, wherein at least one computing system is controlled to provide automation or feedback with respect to real-time atomic actions involved in completing the procedure based on the online action segmentation.

2. The computer-implemented method of claim 1, wherein receiving the image data associated with the multi-view videos of the procedure include receiving image data from multiple cameras that are located at multiple locations within a training environment to capture multi-view videos of the procedure as its completed within the training environment.

3. The computer-implemented method of claim 2, wherein analyzing the image data using the weakly-supervised action segmentation includes using the ordered sequence of action labels that pertain to each of the plurality of atomic actions that are determined and identified as the procedure is completed within the training environment.

4. The computer-implemented method of claim 3, wherein analyzing the image data using the weakly-supervised action segmentation includes determining and labeling each of the plurality of atomic actions that are included within process steps of the procedure.

5. The computer-implemented method of claim 4, wherein determining and labeling each of the plurality of atomic actions include determining a sequence of the plurality of atomic actions that are completed to accomplish the procedure and outputting data that is associated with each of the plurality of atomic actions and the sequence of the plurality of atomic actions that are completed to accomplish the procedure.

6. The computer-implemented method of claim 5, wherein training a neural network includes adding the data that is associated with each of the plurality of atomic actions and the sequence of the plurality of atomic actions that are completed to accomplish the procedure to a dataset of the neural network.

7. The computer-implemented method of claim 6, wherein executing the online action segmentation to label the atomic actions includes implementing an execution mode that pertains to an execution of the procedure in real-time within an execution environment.

8. The computer-implemented method of claim 7, wherein executing the online action segmentation to label the atomic actions includes receiving image data from multiple cameras that are located at multiple locations within the execution environment to capture multi-view videos of the procedure as its completed in real-time within the execution environment.

9. The computer-implemented method of claim 8, wherein executing the online action segmentation to label the atomic actions includes executing machine learning to analyze the image data received from the multiple cameras that are located within the execution environment to use the ordered sequence of atomic actions to label the real-time atomic actions that are taking place within the execution environment.

10. A system for providing weakly-supervised online action segmentation comprising:
    a memory storing instructions when executed by a processor cause the processor to:
    receive image data associated with multi-view videos of a procedure, wherein the procedure involves a plurality of atomic actions;
    analyze the image data using weakly-supervised action segmentation to identify each of the plurality of atomic actions by using an ordered sequence of action labels;
    train a neural network with data pertaining to the plurality of atomic actions based on the weakly-supervised action segmentation; and
    execute online action segmentation to label atomic actions that are occurring in real-time based on the plurality of atomic actions trained to the neural network, wherein at least one computing system is controlled to provide automation or feedback with respect to real-time atomic actions involved in completing the procedure based on the online action segmentation.

11. The system of claim 10, wherein receiving the image data associated with the multi-view videos of the procedure include receiving image data from multiple cameras that are located at multiple locations within a training environment to capture multi-view videos of the procedure as its completed within the training environment.

12. The system of claim 11, wherein analyzing the image data using the weakly-supervised action segmentation includes using the ordered sequence of action labels that pertain to each of the plurality of atomic actions that are determined and identified as the procedure is completed within the training environment.

13. The system of claim 12, wherein analyzing the image data using the weakly-supervised action segmentation includes determining and labeling each of the plurality of atomic actions that are included within process steps of the procedure.

14. The system of claim 13, wherein determining and labeling each of the plurality of atomic actions include determining a sequence of the plurality of atomic actions that are completed to accomplish the procedure and outputting data that is associated with each of the plurality of atomic actions and the sequence of the plurality of atomic actions that are completed to accomplish the procedure.

15. The system of claim 14, wherein training a neural network includes adding the data that is associated with each of the plurality of atomic actions and the sequence of the plurality of atomic actions that are completed to accomplish the procedure to a dataset of the neural network.

16. The system of claim 15, wherein executing the online action segmentation to label the atomic actions includes implementing an execution mode that pertains to an execution of the procedure in real-time within an execution environment.

17. The system of claim 16, wherein executing the online action segmentation to label the atomic actions includes receiving image data from multiple cameras that are located at multiple locations within the execution environment to capture multi-view videos of the procedure as its completed in real-time within the execution environment.

18. The system of claim 17, wherein executing the online action segmentation to label the atomic actions includes executing machine learning to analyze the image data received from the multiple cameras that are located within the execution environment to use the ordered sequence of atomic actions to label the real-time atomic actions that are taking place within the execution environment.

19. A non-transitory computer readable storage medium storing instruction that when executed by a computer, which includes a processor perform a method, the method comprising:
    receiving image data associated with multi-view videos of a procedure, wherein the procedure involves a plurality of atomic actions;
    analyzing the image data using weakly-supervised action segmentation to identify each of the plurality of atomic actions by using an ordered sequence of action labels;
    training a neural network with data pertaining to the plurality of atomic actions based on the weakly-supervised action segmentation; and
    executing online action segmentation to label atomic actions that are occurring in real-time based on the plurality of atomic actions trained to the neural network, wherein at least one computing system is controlled to provide automation or feedback with respect to real-time atomic actions involved in completing the procedure based on the online action segmentation.

20. The non-transitory computer readable storage medium of claim 19, wherein executing the online action segmentation to label the atomic actions includes executing machine learning to analyze image data received from multiple cameras that are located within an execution environment to use an ordered sequence of atomic actions to label real-time atomic actions that are taking place within the execution environment.

* * * * *